(12) United States Patent
Szigeti et al.

(10) Patent No.: US 11,509,532 B2
(45) Date of Patent: *Nov. 22, 2022

(54) SWITCH TRIGGERED TRAFFIC TRACKING

(71) Applicant: Cisco Technology, Inc., San Jose, CA (US)

(72) Inventors: Thomas Szigeti, Vancouver (CA); David John Zacks, Vancouver (CA); Peter Geoffrey Jones, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/021,265

(22) Filed: Sep. 15, 2020

(65) Prior Publication Data
US 2021/0036916 A1 Feb. 4, 2021

Related U.S. Application Data

(63) Continuation of application No. 16/366,968, filed on Mar. 27, 2019, now Pat. No. 10,819,572.

(60) Provisional application No. 62/769,601, filed on Nov. 20, 2018.

(51) Int. Cl.
*H04L 12/24* (2006.01)
*H04L 12/947* (2013.01)
*H04L 41/084* (2022.01)
*H04L 41/14* (2022.01)
*H04L 49/25* (2022.01)

(52) U.S. Cl.
CPC ............ *H04L 41/084* (2013.01); *H04L 41/14* (2013.01); *H04L 49/25* (2013.01)

(58) Field of Classification Search
CPC ..... H04L 41/084; H04L 41/14; H04L 41/085; H04L 41/0853; H04L 49/25; H04L 49/252
USPC .................................................. 370/254–255
See application file for complete search history.

(56) References Cited

U.S. PATENT DOCUMENTS

| | | | |
|---|---|---|---|
| 7,656,812 B2 | 2/2010 | Tadimeti et al. | |
| 8,457,128 B2 | 6/2013 | Pepper et al. | |
| 8,787,176 B2 | 7/2014 | Ford et al. | |
| 8,958,318 B1 | 2/2015 | Hastwell et al. | |
| 10,003,660 B2 | 6/2018 | Furr et al. | |
| 2008/0049774 A1 | 2/2008 | Swenson et al. | |
| 2010/0049860 A1 | 2/2010 | Kouvelas et al. | |
| 2011/0080835 A1 | 4/2011 | Malomsoky et al. | |
| 2013/0114612 A1* | 5/2013 | Singh .................. | H04L 43/026 370/400 |

(Continued)

*Primary Examiner* — Candal Elpenord
(74) *Attorney, Agent, or Firm* — Polsinelli

(57) ABSTRACT

Systems and methods provide for performing performance analytics processing of network traffic by copying packets of network traffic to a switch CPU based on a flag. The systems and methods disclosing receiving network traffic comprising one or more packet, generating a network traffic flow record associated with the received network traffic, the network traffic flow record including a copy-to-CPU bit and one or more function flag bits, setting the copy-to-CPU bit to an on configuration, processing the one or more packets by one or more functions to generate network flow analytics, wherein the one or more function flag bits are set in response to the one or more functions generating network flow analytics, and setting the copy-to-CPU bit to an off configuration.

20 Claims, 17 Drawing Sheets

(56) References Cited

U.S. PATENT DOCUMENTS

| | | |
|---|---|---|
| 2013/0343390 A1 | 12/2013 | Moriarty et al. |
| 2013/0347103 A1 | 12/2013 | Veteikis et al. |
| 2017/0093678 A1* | 3/2017 | Gnanasekaran .... H04L 43/0852 |
| 2017/0279817 A1 | 9/2017 | Campbell et al. |
| 2017/0302569 A1* | 10/2017 | Ramaswamy .......... H04L 45/32 |
| 2020/0145315 A1* | 5/2020 | Levy ....................... H04L 45/24 |

* cited by examiner

CISCO DNA CENTER

✦ Design ← 206
Model your entire network, from ??? and buildings to devices and ???, both physical and virtual, across campus, branch, WAN and cloud.
- Add ??? locations on the network
- Designate golden images for device families
- Create wireless profiles of SSIDs

⚙ Provision ← 210
Provide new services to users with ????, speed and security across your enterprise network, regardless of network ????? and complexity.
- Discover and provision switches to ????????? sites
- Provision WLCs and APs to ????? sites
- Set up Campus Fabric across switches

⚔ Policy ← 208
Use policies to complete and simplify network management, reducing cost and risk while speeding rollout of new and enhanced services
- Segment your network as Virtual Networks
- Create scalable groups to describe your critical assets
- Define segments from policies to meet your policy goals

◈ Assurance ← 212
Use proactive monitoring and insights from the network, devices, and applications to predict problems faster and ????? that policy and configuration changes achieve the ???????? internet and the user experience you want.
- Assurance Health
- Assurance ?????

⌸ Platform ← 214
Use DNA-C Platform to unlock the full potential of DNA-C using APIs, integration capabilities and Data services
- View the API Catalog
- Configure DNA- to - Third Party Integrations
- Schedule and Download - Data Sets and Reports

Tools ← 216

| Discovery 302 | Inventory 304 | Topology 306 | Image Repository 308 |
| Automatic addition of devices in controller inventory | Add, update or delete devices that are managed by the controller | Visualize how devices are interconnected and how they communicate | Download and manage physical and virtual software images automatically |

| Command Runner 310 | License Manager 312 | Template Editor 314 | Network Plug and Play 316 |
| Allows you to run diagnostic CLIs against one or more devices | Visualize and manage license usage | An interactive editor to author CLI templates | A simple and secure approach to provision networks with a near zero touch experience |

| Telemetry 318 | Data Sets and Reports 320 | | |
| Telemetry Design and Provision | Access Data Sets, Schedule Data Extracts for Download in multiple formats like PDF Reports, CSV, Tables etc | | |

FIG. 3A

SWITCH TRIGGERED TRAFFIC TRACKING

CROSS-REFERENCE TO RELATED APPLICATIONS

This application claims the benefit of, and priority to, U.S. Non-Provisional Patent Application No. 16/366,968, filed Mar. 27, 2019, which claims the benefit of U.S. Provisional Patent Application No. 62/769,601, filed Nov. 20, 2018, the full disclosures of which are incorporated herein by reference in their entireties.

TECHNICAL FIELD

The subject matter of this disclosure relates in general to the field of computer networking, and more particularly, to systems and methods for improving the operation of an enterprise network.

BACKGROUND

A campus network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges a campus network may face include integrating wired and wireless devices, on-boarding computing devices and things that can appear anywhere in the network and maintaining connectivity when the devices and things migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT.

Current approaches for deploying a network capable of providing these functions often require constant and extensive configuration and administration by highly skilled network engineers operating several different systems (e.g., directory-based identity services; authentication, authorization, and accounting (AAA) services, wireless local area network (WLAN) controllers; command line interfaces for each switch, router, or other network device of the network; etc.) and manually stitching these systems together. This can make network deployment difficult and time-consuming, and impede the ability of many organizations to innovate rapidly and to adopt new technologies, such as video, collaboration, and connected workspaces.

BRIEF DESCRIPTION OF THE FIGURES

To provide a more complete understanding of the present disclosure and features and advantages thereof, reference is made to the following description, taken in conjunction with the accompanying drawings, in which:

FIGS. 3A-3I illustrate examples of graphical user interfaces for a network management system in accordance with some examples;

DESCRIPTION OF EXAMPLE EMBODIMENTS

Figure 1:
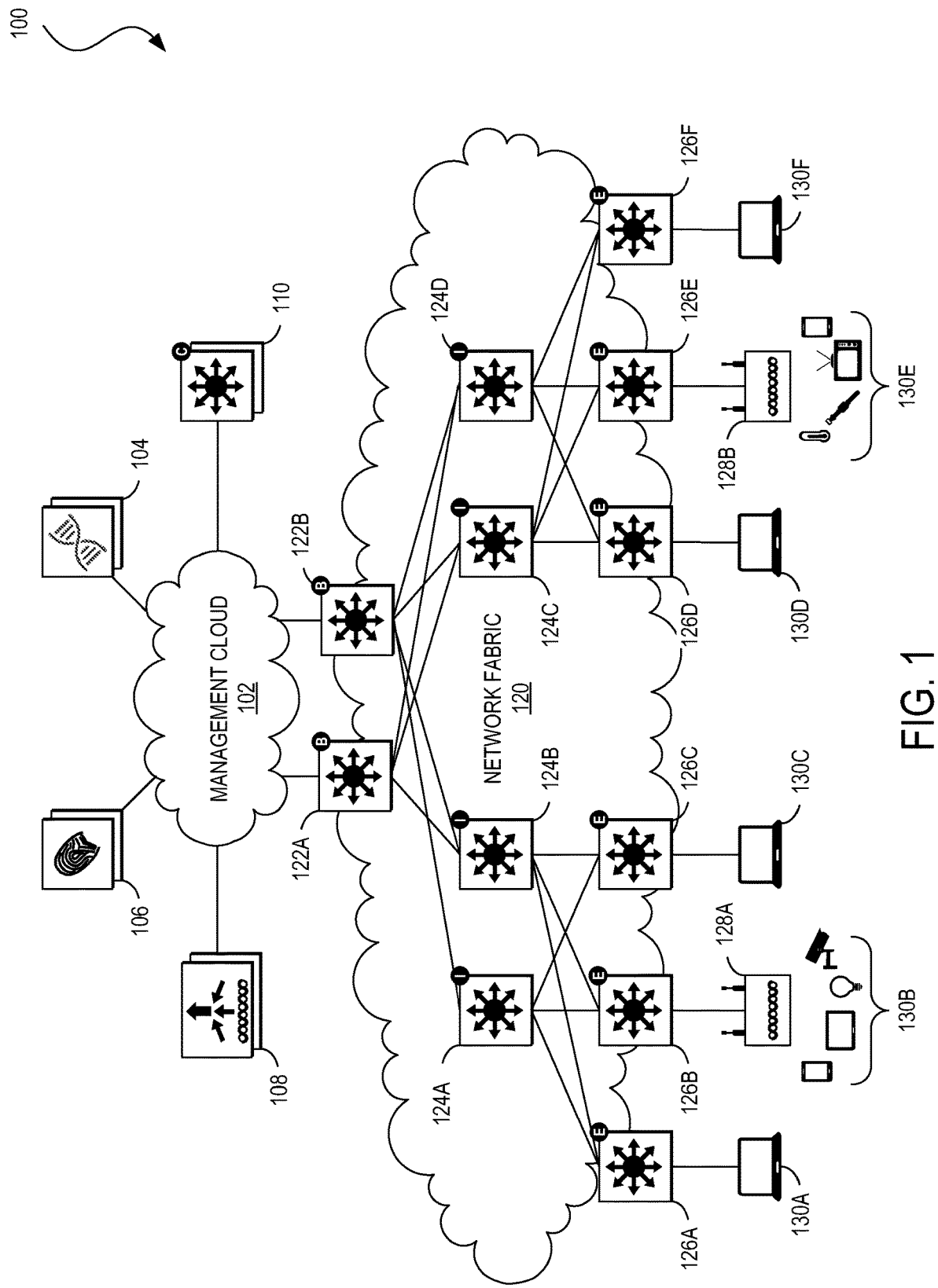
FIG. 1 illustrates an example of a physical topology of an enterprise network in accordance with some examples.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems, methods and non-transitory computer-readable media are described for generating telemetry and other network analytics data for network traffic as it flows across a network switch application specific integrated circuit (ASIC). In some examples, a network traffic flow record may be generated by a network switch ASIC for tracking network traffic. The network traffic flow record may include a flag, such as a bit, which can be set from "off" to "on" (e.g., changing the value of the bit from "0" to "1") in order to copy packets of the respective network flow to a processing device, such as a CPU, of the network switch (e.g., the bit may be a "copy-to-CPU" bit). Packets copied to the CPU can be inspected by network functions stored on-device, such as Network Based Application Recognition (NBAR), Encrypted Traffic Analytics (ETA), Application Response Time (ART), Performance Monitoring (Perfmon), and others. Processing of the packets can be performed by each function in turn and bit flags can be assigned to each function so that once all function bit flags have been cleared following completion of packet processing, the copy-to-CPU bit may also be cleared and network traffic can continue across the switch ASIC without being copied for analytics. Results of the functions can be provided to downstream services and processes such as, for example, Cisco® DNA Center and the like.

Example Embodiments

In many situations, a network administrator may wish to know how applications are performing over a network. For example, a network administrator may wish to inspect application performance over a campus network to identify a problem area, isolate domains, determine root causes for a problem, and/or remediate application performance issues. A switch-based performance monitoring service that monitors traffic related to applications as it traverses one or more switches in a network may provide granular and detailed traffic information (e.g., related to the application, etc.) so that, for example, a network administrator can identify problem areas and solutions without necessitating large scale processing of all network traffic. In effect, the switch-based performance monitoring service enables scalable monitoring and processing of network traffic.

In most cases, detailed analysis of Real Time Protocol (RTP) flows and Transmission Control Protocol (TCP) flows cannot be performed in a network data plane. For example, the Unified Access Data Plane (UADP) ASIC (e.g., hardware) is not able to perform granular processing of RTP and TCP flows due to hardware limitations (e.g., processing speed, memory size/allocation, etc.). However, processing the data flows can be performed in software by one or more processing devices (e.g., a Central Processing Unit (CPU), etc.) on a switch within the respective network.

In many cases, though, CPU processes cannot scale to large networks or networks with high throughput demands, such as campus gigabit and multi-gigabit speed networks. However, a subset of traffic processed by a switch (e.g., "interesting" traffic) can be defined and identified for copying to the processor (e.g., the CPU) for analysis either by the processor or after being forwarded to a control plane data flow.

Interesting traffic can be defined as, for example and without imputing limitation, network traffic related to a specific application(s), network traffic generated by a specific user, a network traffic sourced from or destined to a specific network endpoint, network traffic sourced from or destined to a specific application server, a sample of an aggregate traffic flow (e.g., 10% of all packets are analyzed), etc.

Interesting traffic need not be defined on a per-device basis. For example, an assurance platform may define and/or maintain definitions of interesting traffic. Furthermore, "interesting" traffic definitions can be altered on demand because the definitions may be updated by a control plane interface and/or the assurance platform. For example, if a specific user is having issues with a video application, then a filter can be generated based on interesting traffic definitions and may be applied by the assurance platform on-the-fly by a network administrator or the like for troubleshooting purposes. The definitions may apply across any and/or every switch in the network or along a path of relevant traffic flow based on a topology of the network (e.g., using a topology awareness utility, etc.).

Additionally, further performance optimizations can be realized by not collecting unconsumed metrics. For example, where an application response time (ART) monitor may measure 26 Key Performance Indicators (KPIs) for providing to an associated assurance platform that only consumes six KPIs for performing analytics. In effect, CPU processing loads may be alleviated by only collecting KPIs of interest by defining interesting traffic according to the KPIs of interest for performing analytics by the assurance platform.

In some examples, traffic from a user device may arrive to a switch at a given port or VLAN on a switch. The switch may be part of a data plane (e.g., routers, switches, servers, etc.) of a private network, such as a campus or enterprise network. The user device may be a laptop, computer, mobile device (e.g., smartphone, tablet, etc.), or other network connected device on the private network. While a user device is discussed here as an example, in other examples traffic may arrive from a server, terminal, or other network endpoint of the private network.

A new network flow record can be generated by the switch hardware (e.g., a UADP-ASIC) for a respective user device traffic flow. The record may be an entry in a table, a tuple data structure (e.g., a 5-tuple containing origin, destination, bitflags, etc.). A bitflag within or associated with the network flow record (e.g., a toggle-able bit) may be set into an off configuration (e.g., set to "0") by default. In some examples, the default state of the bitflag may be based on the switch configuration for traffic-analysis filtering criteria on the new network flow record.

The bitflag may be toggled into an on configuration (e.g., set to "1") automatically by, for example, an assurance platform performing automated troubleshooting operations or a network administrator, etc. In the on configuration, the bitflag may indicate that a copy of the packets for network traffic associated with the relevant network flow record should be sent to the switch CPU (e.g., a "copy-to-CPU" bit) while the traffic is otherwise forwarded in hardware as normal (e.g., to a next hop, network interface, etc.).

Multiple functions on the switch can set the copy-to-CPU bit for traffic that may merit inspection. For example, encrypted traffic analytics (ETA), or another function operating on the switch, may also inspect the new network traffic flow. Once the copied network traffic arrives at the switch CPU, it can be processed in turn by one or more functions for inspect the series of packets from the network traffic flow. For example, and without imputing limitation, a switch triggered traffic tracking (ST3) process can analyze the network traffic flow to determine an application response time (ART) and/or a performance monitoring metric. ART processing can provide a view of an entire TCP network traffic flow for the subset of traffic involved, from producer to consumer. By inspecting these flows, application performance metrics may be derived, such as, and as examples without imputing limitation, network latency, packet loss, and application server delay. These metrics can be used when analyzing application performance end-to-end. As a result, such ART metrics can be made available by ST3 on hardware-based switch platforms as well as on software-based routers and for a particular (and designated) subset of the network traffic flows. Likewise, performance monitoring may provide analysis and metrics for UDP-based RTP traffic flows, such as those associated with voice and video.

When each type of process completes analysis of a copied packet, the packets involved can be provided to any subsequent process in turn, if any exist. For example, when ETA is finished processing a given packet for malware detection and analysis, the packet can in turn be provided to ST3 for application performance analysis. Various processes may complete respective processing of the packet(s) at different times. For example, ETA can be finished processing the packet(s) (of copied network traffic) for malware detection, but ST3 may take longer to complete. In some examples, when each process completes respective traffic analyses, a respective bit for the respective process may be modified (e.g., flipped) to denote that the respective process no longer needs the network traffic flow. When all of the software processes requiring the copied network traffic flow have completed, then the copy-to-CPU bit in the corresponding network flow hardware entry may be switched to an off configuration. As a result, coordination between various processes utilizing the copied-to-CPU network traffic flows can be achieved. Additionally, telemetry from analytic results generated by ST3 may be sent to downstream processes (e.g., platforms for monitoring, assurance, etc.) as needed and upon completion of the traffic analysis by the switch. In some examples, the analytics may be provided to visualizations platforms for use by a network manager or assurance platforms, etc.

Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
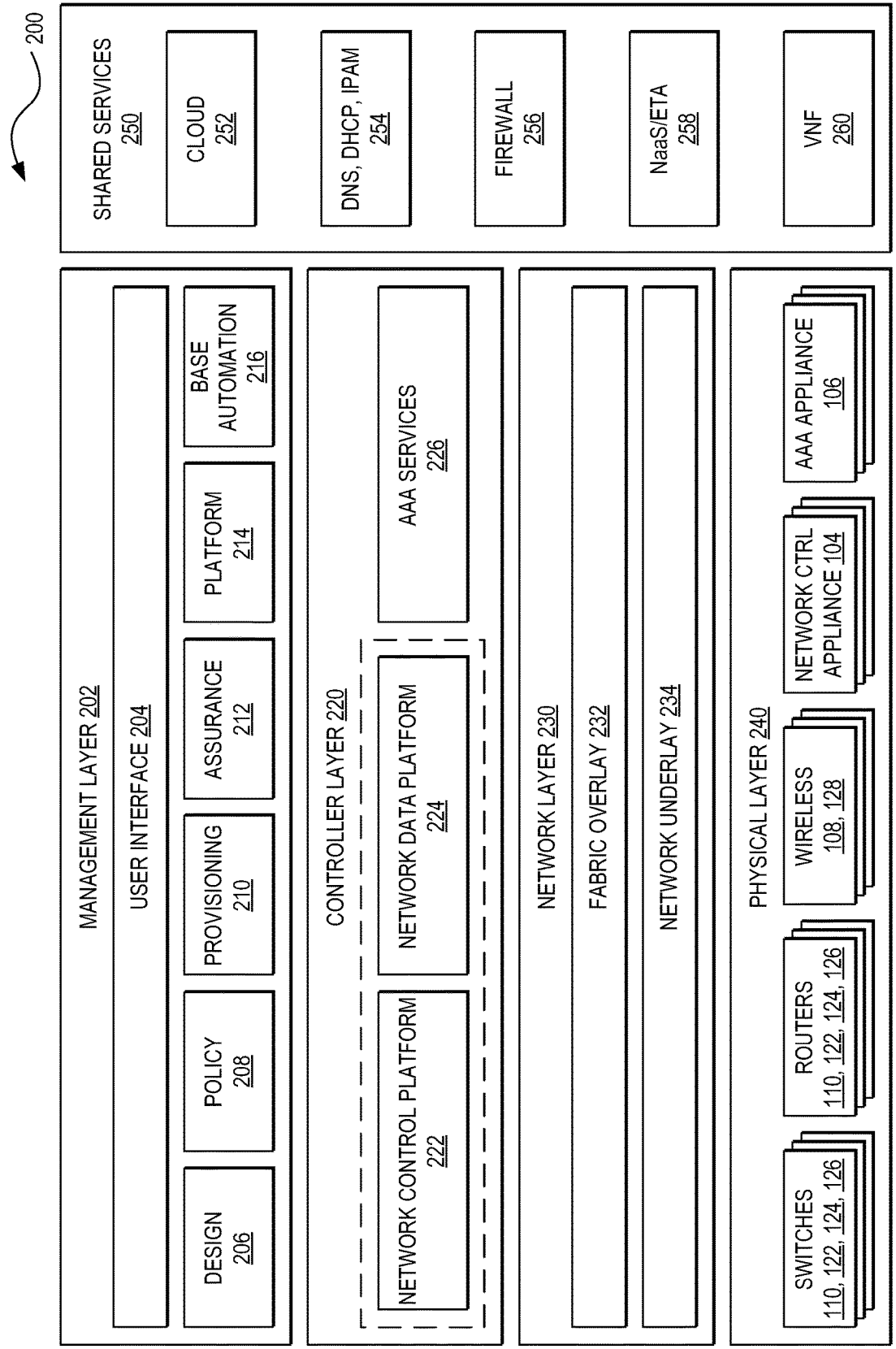
FIG. 2 illustrates an example of a logical architecture for an enterprise network in accordance with some examples.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

- A network discovery tool 302 for automating the discovery of existing network elements to populate into inventory;
- An inventory management tool 304 for managing the set of physical and virtual network elements;
- A topology tool 306 for visualizing the physical topology of network elements;
- An image repository tool 308 for managing software images for network elements;
- A command runner tool 310 for diagnosing one or more network elements based on a CLI;
- A license manager tool 312 for administering visualizing software license usage in the network;
- A template editor tool 314 for creating and authoring CLI templates associated with network elements in a design profile;
- A network PnP tool 316 for supporting the automated configuration of network elements;
- A telemetry tool 318 for designing a telemetry profile and applying the telemetry profile to network elements; and
- A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
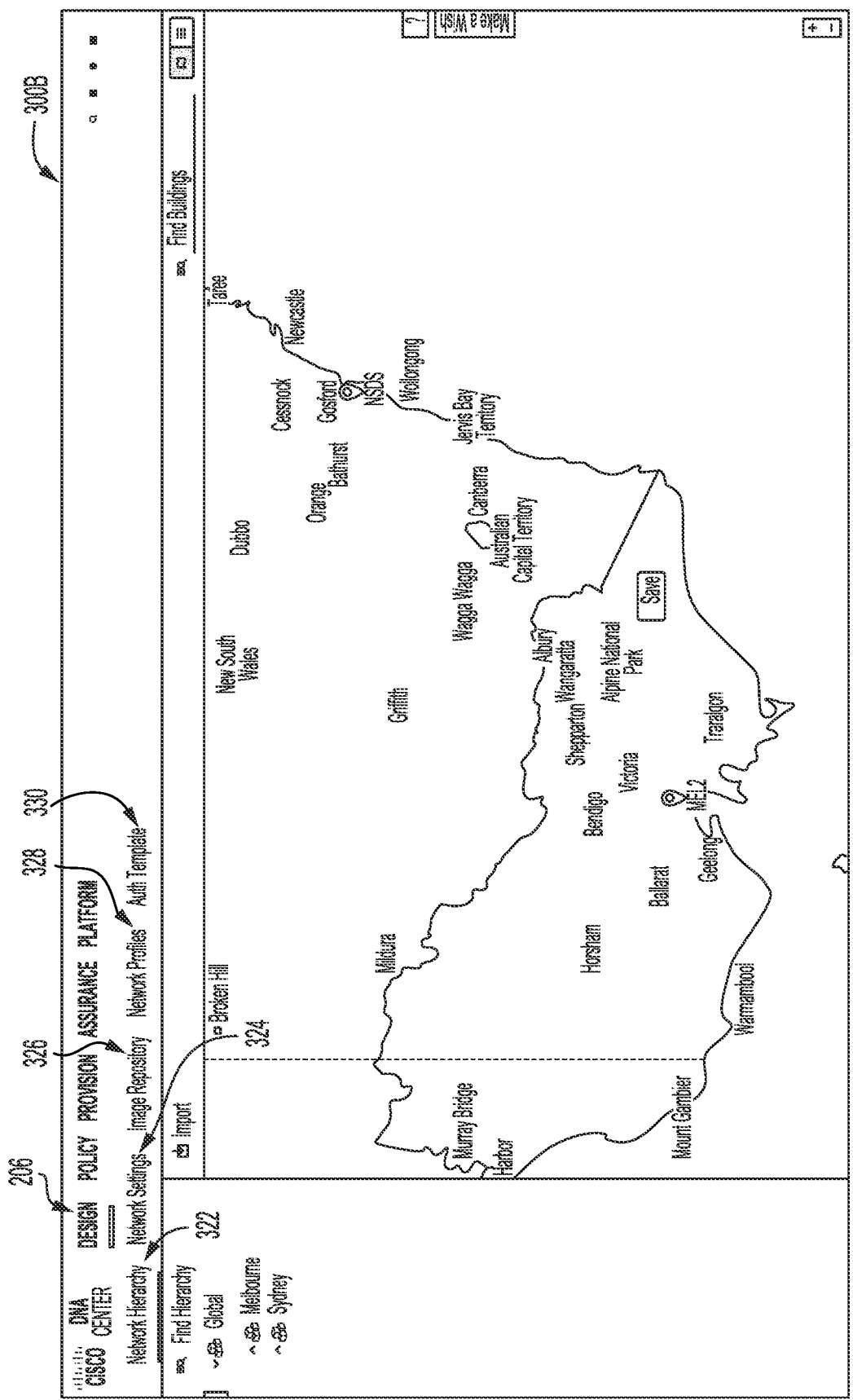

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

- A network hierarchy tool 322 for setting up the geographic location, building, and floor plane details, and associating these with a unique site id;
- A network settings tool 324 for setting up network servers (e.g., Domain Name System (DNS), DHCP, AAA, etc.), device credentials, IP address pools, service provider profiles (e.g., QoS classes for a WAN provider), and wireless settings;
- An image management tool 326 for managing software images and/or maintenance updates, setting version compliance, and downloading and deploying images;
- A network profiles tool 328 for defining LAN, WAN, and WLAN connection profiles (including Service Set Identifiers (SSIDs)); and
- An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
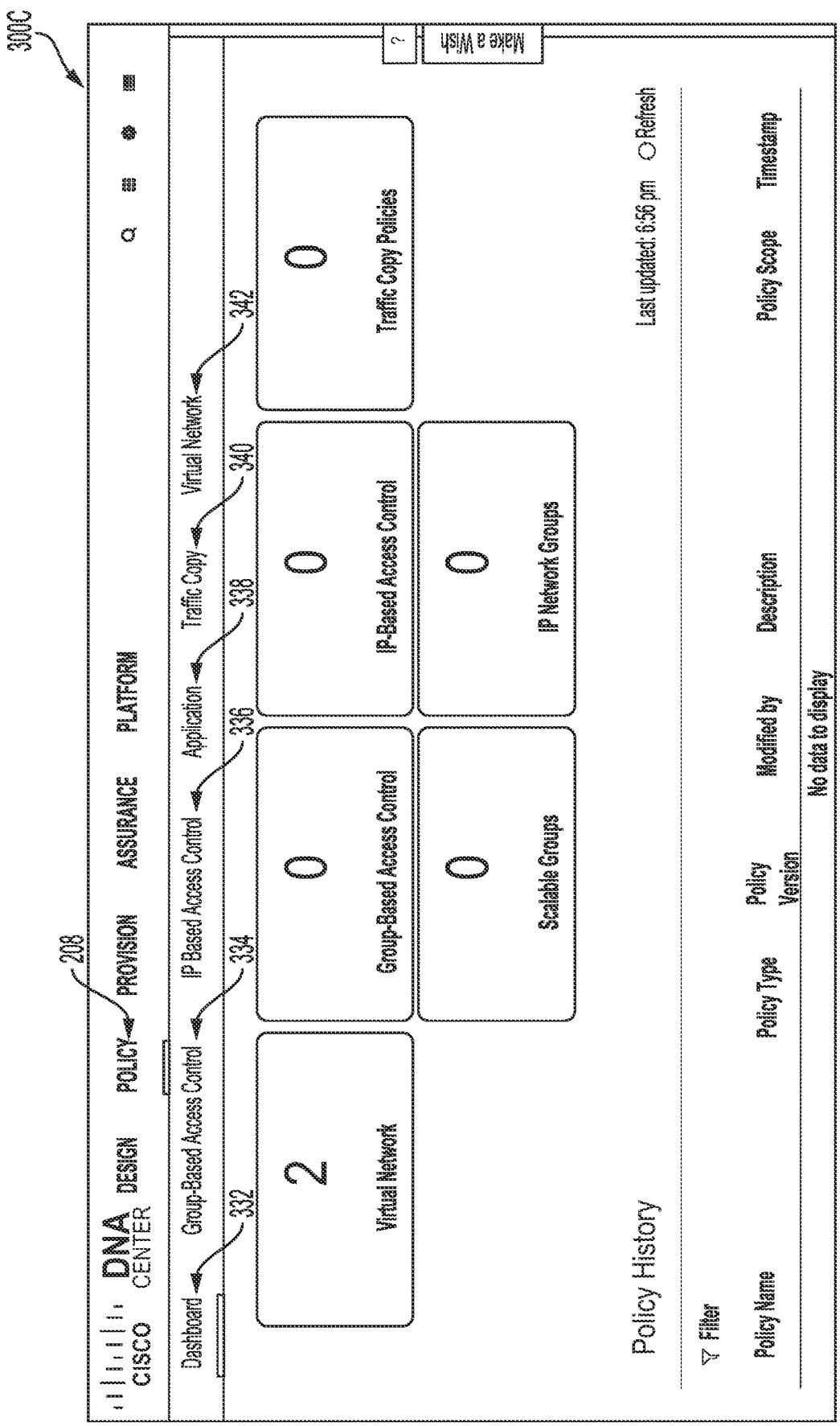

FIG. 3C illustrates a graphical user interface 300C, an example of a landing screen for the policy functions 208. The graphical user interface 300C can include various tools and workflows for defining network policies. In this example, the policy design tools and workflows include:

- A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;
- A group-based access control policies tool 334 for managing group-based access controls or SGACLs. A group-based access control policy can define scalable groups and an access contract (e.g., rules that make up the access control policies, such as permit or deny when traffic matches on the policy);
- An IP-based access control policies tool 336 for managing IP-based access control policies. An IP-based access control can define an IP network group (e.g., IP subnets that share same access control requirements) and an access contract;
- An application policies tool 338 for configuring QoS for application traffic. An application policy can define application sets (e.g., sets of applications that with similar network traffic needs) and a site scope (e.g., the site to which an application policy is defined);
- A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and
- A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
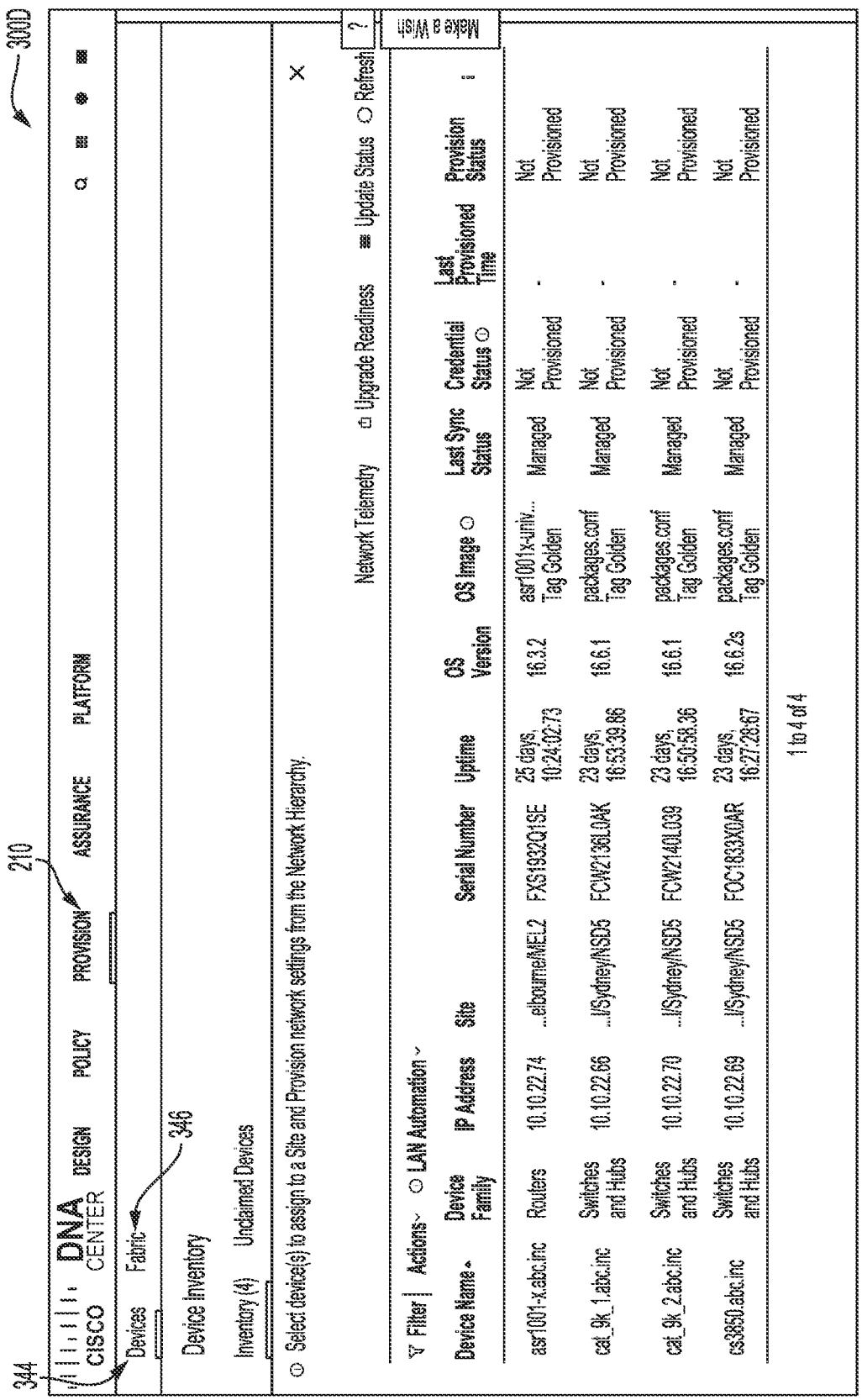

FIG. 3D illustrates a graphical user interface 300D, an example of a landing screen for the provisioning functions 210. The graphical user interface 300D can include various tools and workflows for deploying the network. In this example, the provisioning tools and workflows include:

- A device provisioning tool 344 for assigning devices to the inventory and deploying the required settings and policies, and adding devices to sites; and
- A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
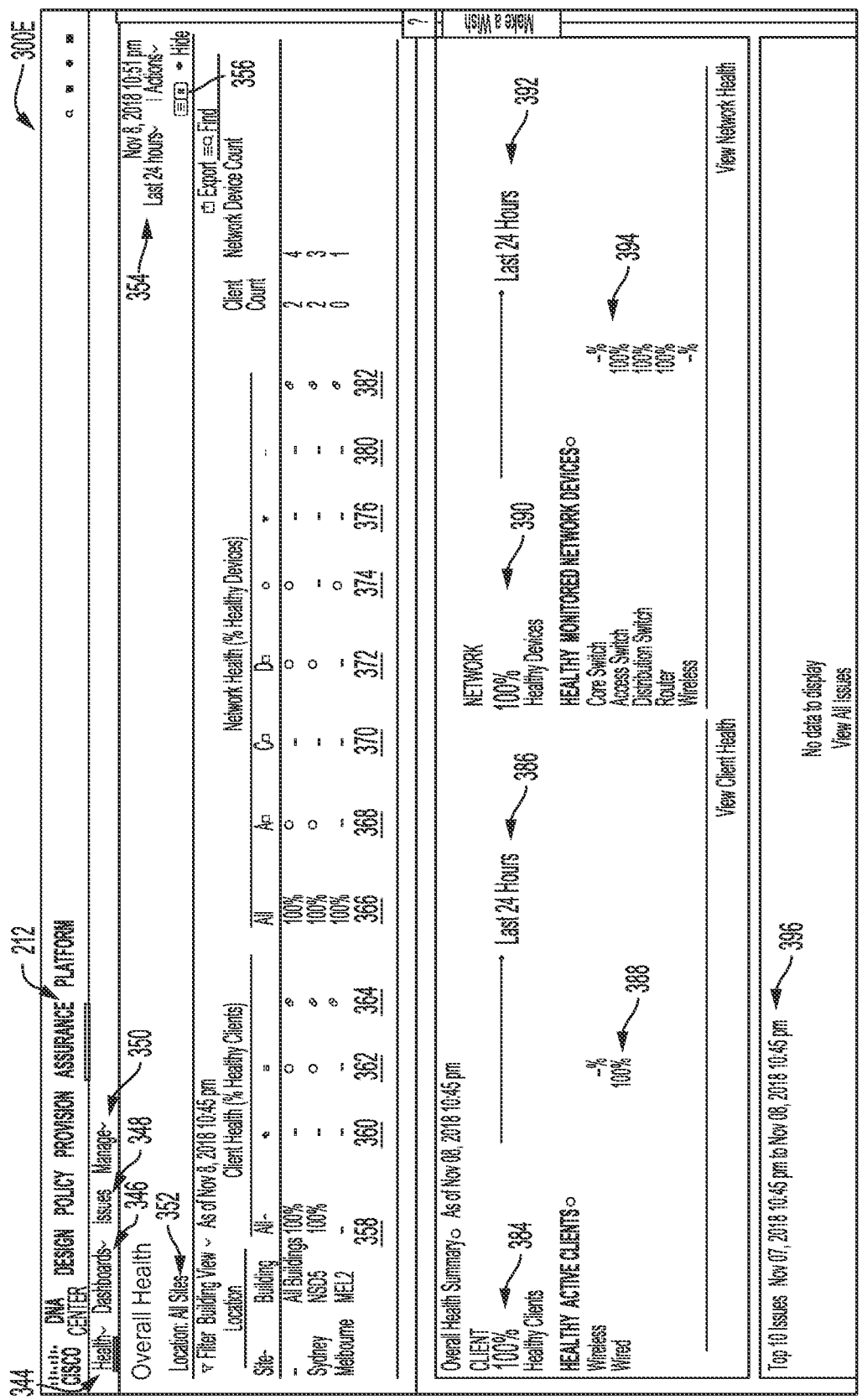

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network infrastructure devices and endpoints. The user interface element (e.g., drop-down menu, a dialog box, etc.) associated with the health overview tool 344 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 354 can enable a user to view the overall health of specific sites (e.g., as defined via the network hierarchy tool 322) and/or network domains (e.g., LAN, WLAN, WAN, data center, etc.). The time period selection user interface element 356 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
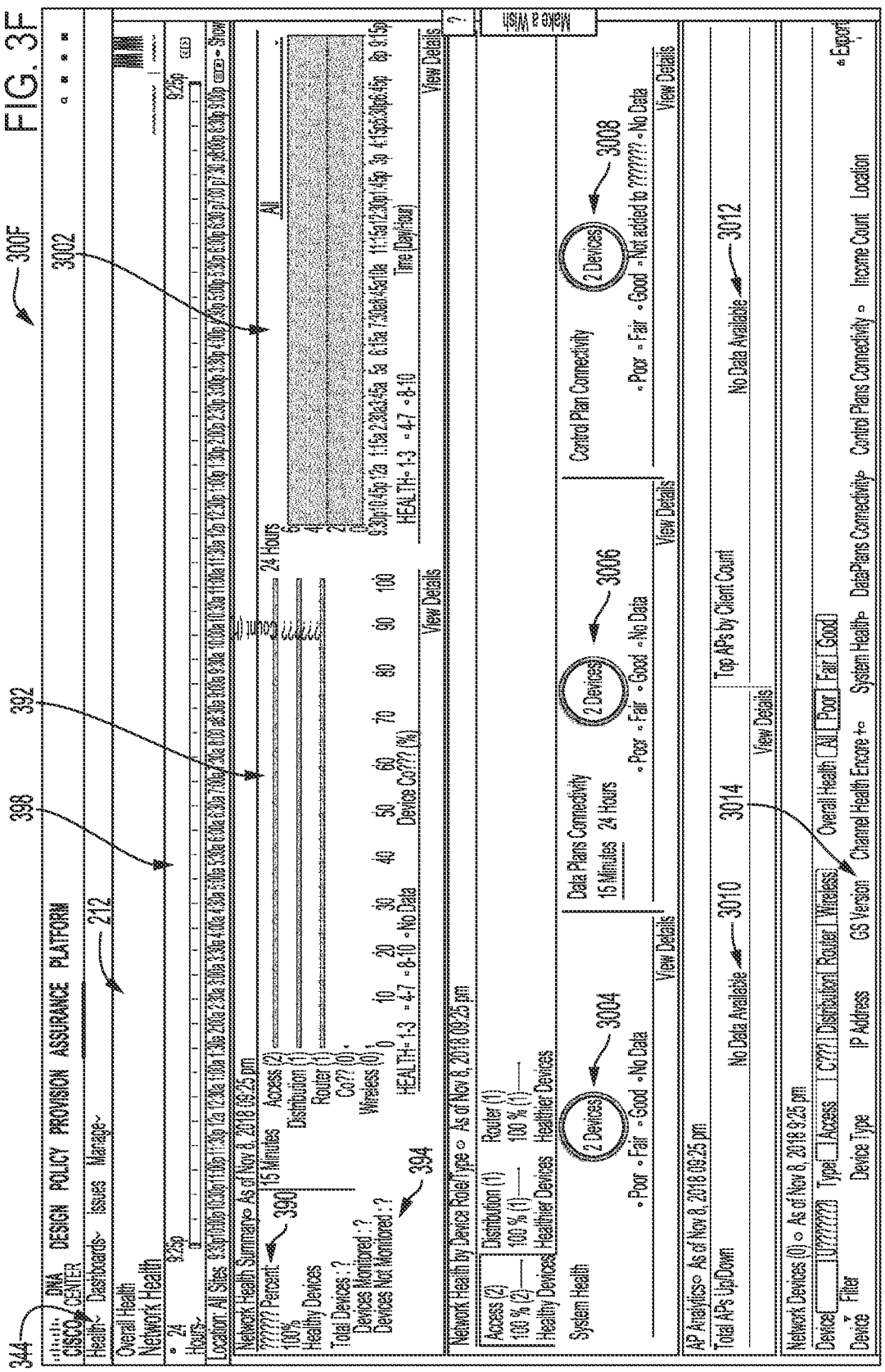

FIG. 3F illustrates a graphical user interface 300F, an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices as a percentage 390, the color coded trend charts 392 indicating that percentage by device type, the breakdown of the number of healthy network infrastructure devices by device type 394, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
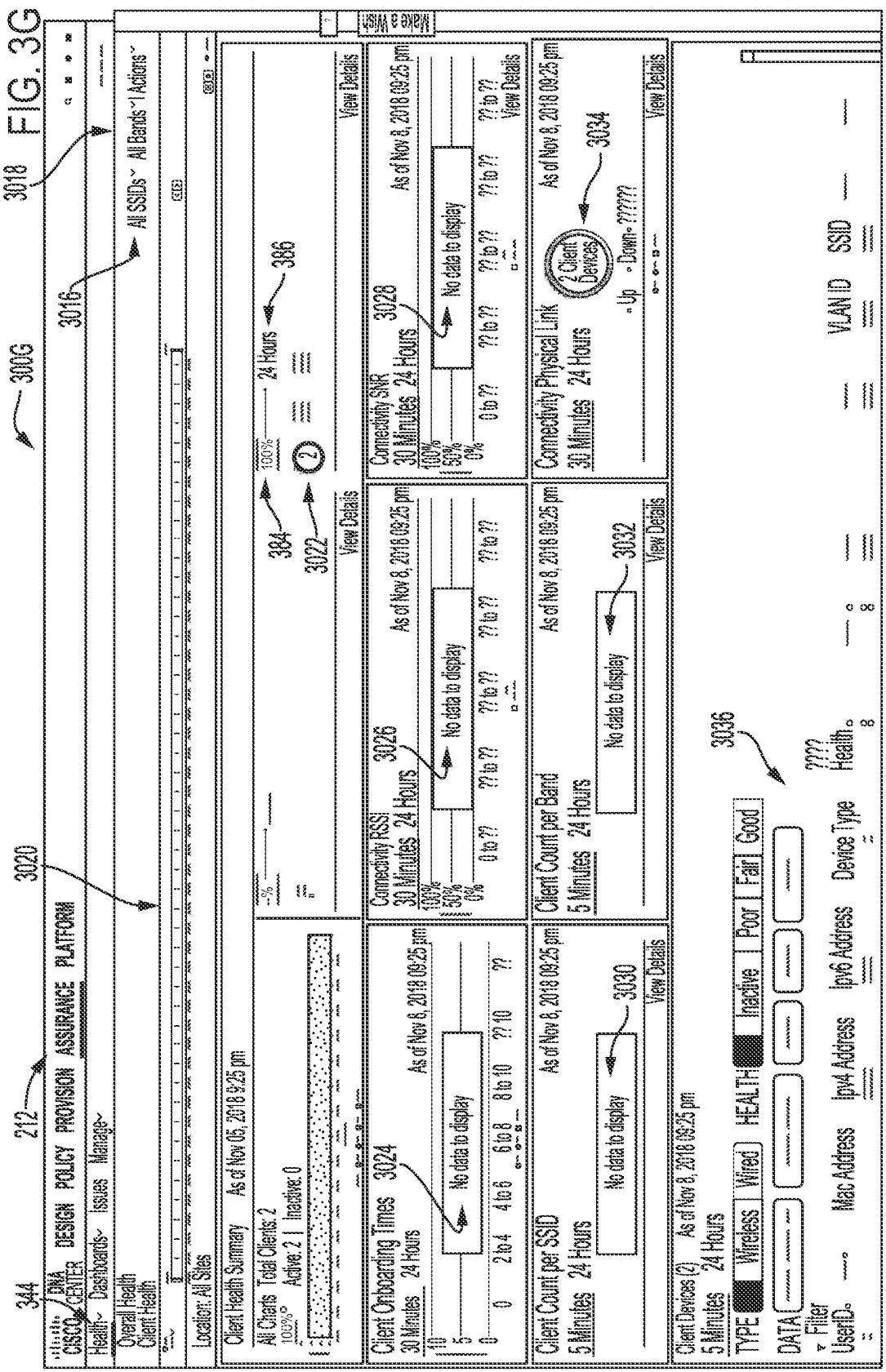

FIG. 3G illustrates a graphical user interface 300G, an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the time slider 398.

The graphical user interface 300G can also include a client health summary user interface element that provides similar information to that shown in the graphical user interface 300E, such as the number of healthy clients as a percentage 384 and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:
  Client onboarding times 3024;
  Received Signal Strength Indications (RSSIs) 3026;
  Connectivity signal-to-noise ratios (SNRs) 3028;
  Client counts per SSID 3030;
  Client counts per band frequency 3032;
  DNS requests and response counters (not shown); and
  Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
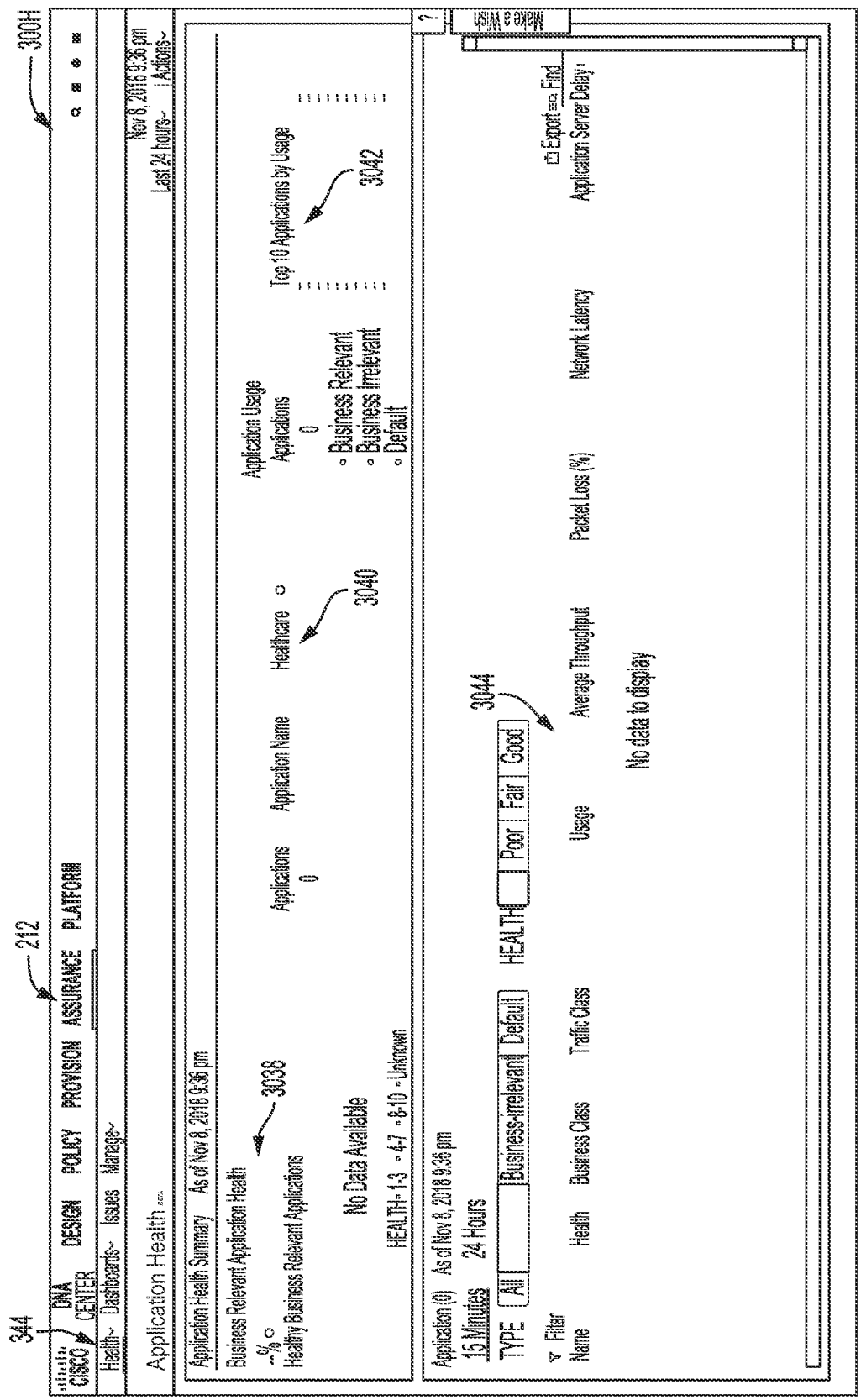
Figure 31:
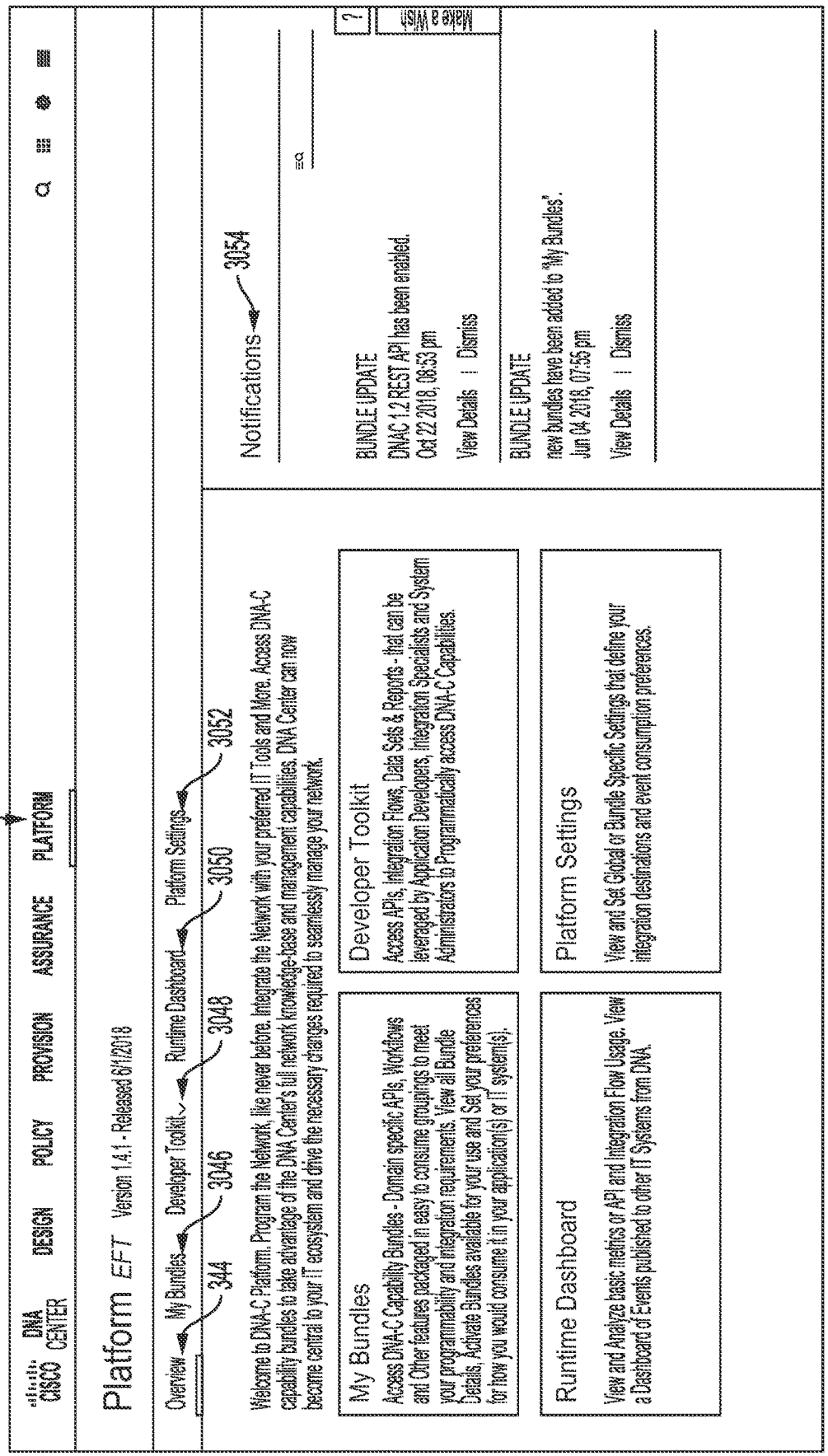

FIG. 3H illustrates a graphical user interface 300H, an example of a screen for an overview of the health of applications, which may be navigated to, for instance, by toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

FIG. 3I illustrates an example of a graphical user interface 3001, an example of a landing screen for the platform functions 210. The graphical user interface 300C can include various tools and workflows for integrating with other technology systems. In this example, the platform integration tools and workflows include:
  A bundles tool 3046 for managing packages of domain-specific APIs, workflows, and other features for network programming and platform integration;
  A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;
  A runtime dashboard 3050 for viewing and analyzing basic metrics or API and integration flow usage;
  A platform settings tool 3052 to view and set global or bundle-specific settings that define integration destinations and event consumption preferences; and
  A notifications user interface element 3054 for presenting notifications regarding the availability of software updates, security threats, and so forth.

Returning to FIG. 2, the controller layer 220 can comprise subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 208 212. In addition, the network control platform 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
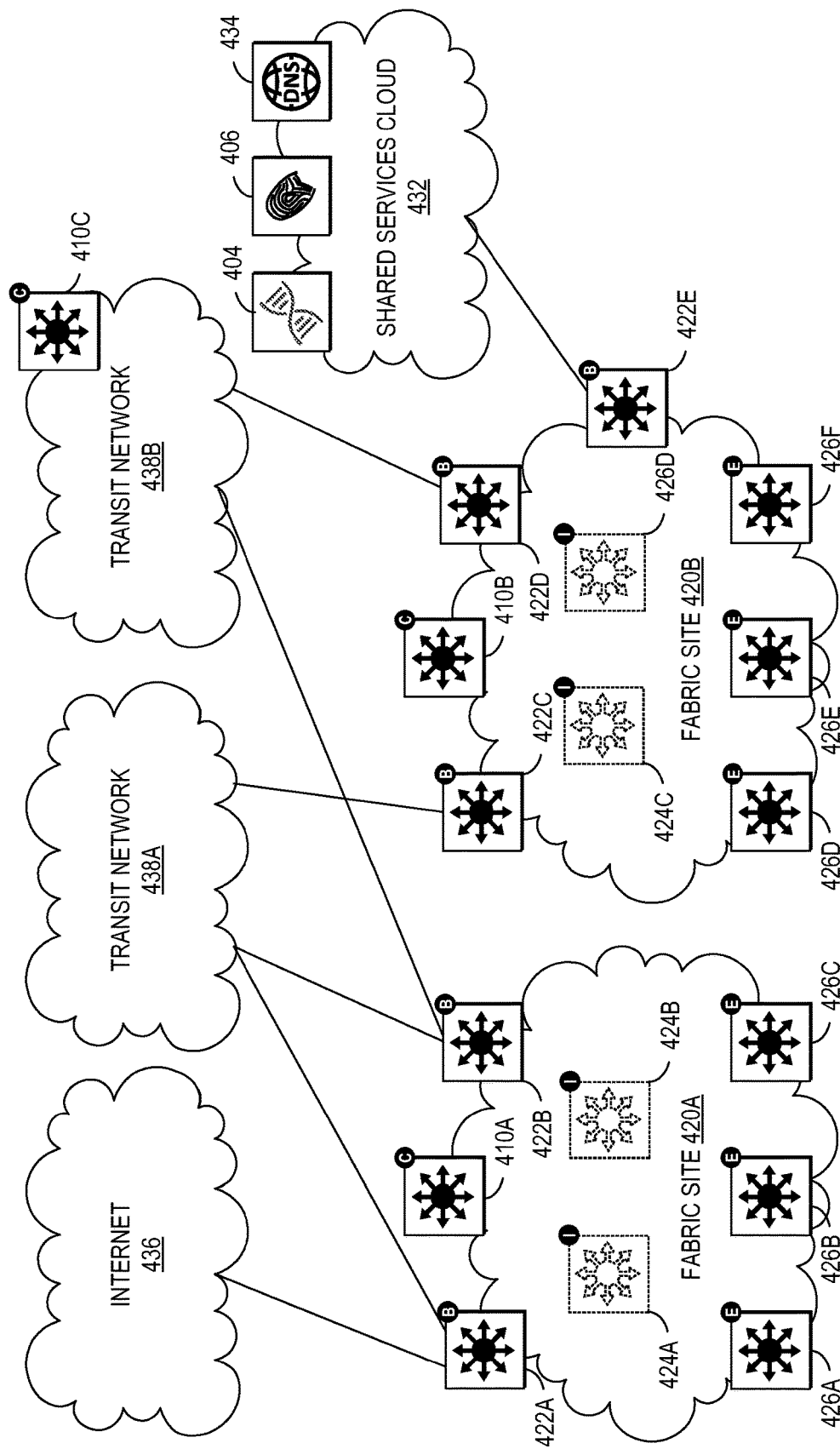
FIG. 4 illustrates an example of a physical topology for a multi-site enterprise network in accordance with some examples.

FIG. 4 illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5A:
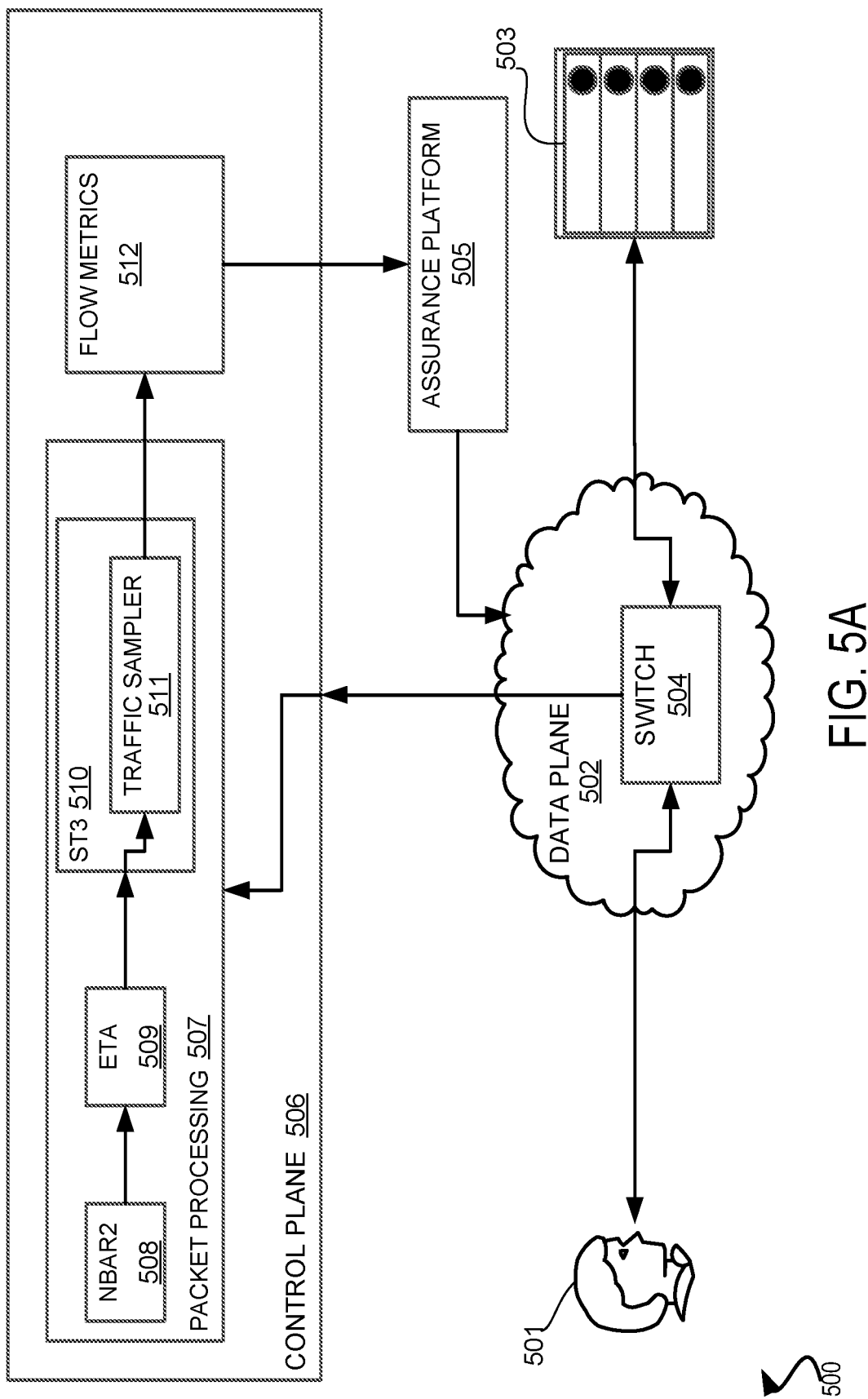
FIG. 5A illustrates an example of a switch triggered traffic tracking system in accordance with some examples.

FIG. 5A illustrates a system 500 for performing switch triggered traffic analysis. Network traffic flowing between a user 501 and a server 503 may be designated by a network administrator as undergoing analytics and processing on a switch 504. As the network traffic traverses a data plane 502 (e.g., private network, etc.), switch 504 receives and copies packets of the network traffic flow to a memory local to switch 504 and accessible by a local processing device. Both copied and uncopied network traffic flow may otherwise proceed to a destination (e.g., from user 501 to server 503).

The copied packets may be processed by functions and processes of a control plane 506. In some examples, portions of control plane 506 may be stored locally on switch 504 (or other hardware within data plane 502). In other examples, the functions and processes of control plane 506 may be stored entirely elsewhere (e.g., at a remote server, distributed within a service mesh, etc.).

Nevertheless, control plane 506 may include a packet processing service 507 for processing packets received from switch 504 to produce analytics, etc. Packet processing service 507 may include a network based application recognition (NBAR2) process 508 for performing application specific processing, an encrypted traffic analytics (ETA) process 509 for performing traffic specific processing (e.g., malware detection, spam detection, etc.), a switch triggered traffic tracking (ST3) process 510 for performing network traffic flow analytics, and a flow metrics process 512 for generating network traffic flow metrics. Here, packet processing 507 provides may, based on analyses selected by, for example, a network administrator, packets to NBAR2 process 508, then to ETA process 509, then to ST3 process 510, and finally to flow metrics process 512. In some cases, some or none of processes 508-512 may require packets from a network traffic data flow and so may be skipped in processing packet data. Additionally, ST3 process 510 may include a traffic sampler 511 for determining whether or not to process particular packets. For example, traffic sampler 511 may be set (e.g., by the network administrator) to only sample one out of every 10, 100, 1000, etc. packets from a network traffic flow and so may indicate that ST3 process 510 is to be skipped in packet processing service 507 flows.

Analytics from packet processing service 507 may be provided to downstream services and processes outside of control plane 506. Here, for example, outputs are provided to an assurance platform 505. Assurance platform 505 may aggregate analytics from one or more packet processing services 507 or control planes 506 to generating reports for a network administrator, etc.

Figure 5B:
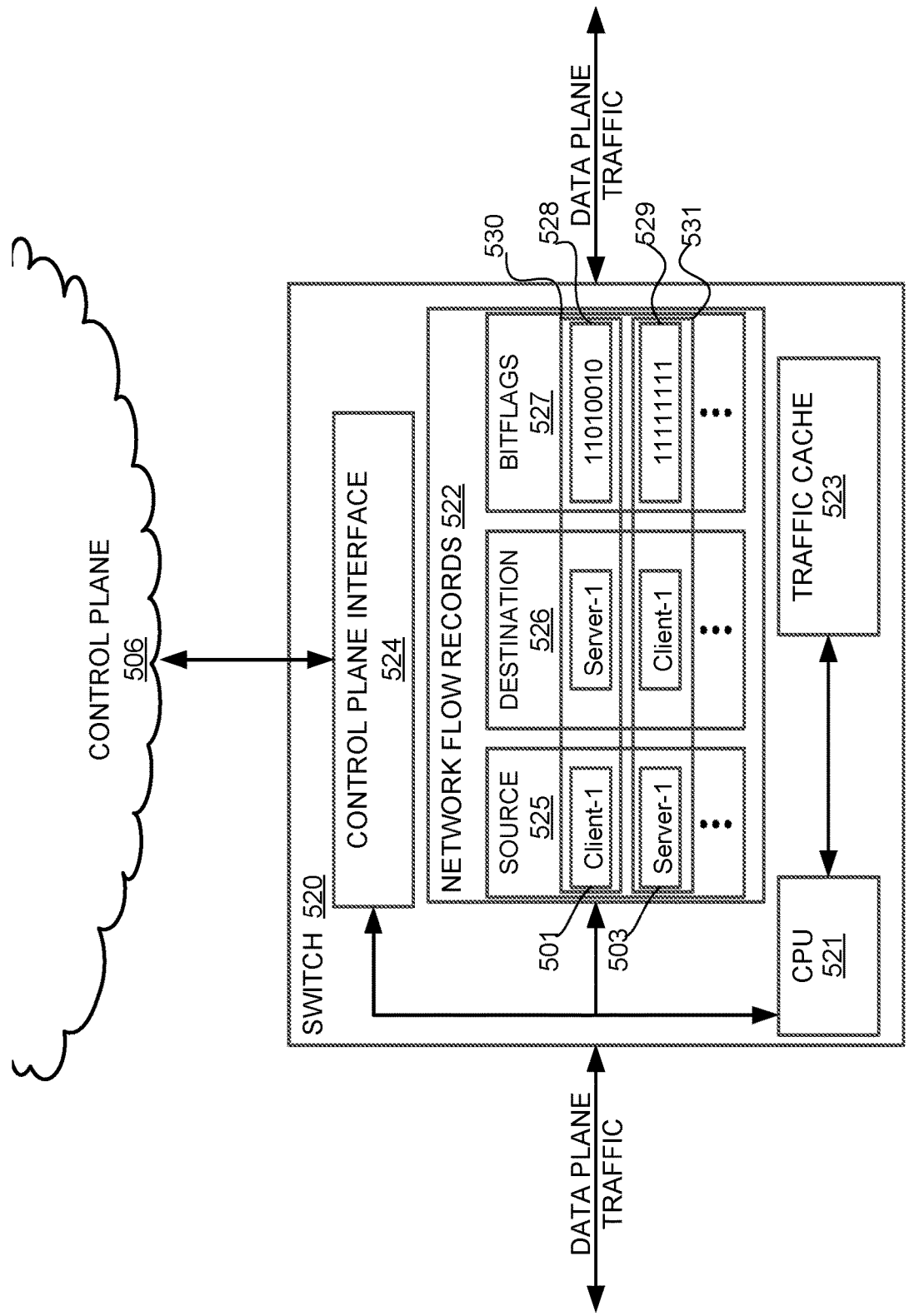
FIG. 5B illustrates a block diagram of an example switch system in accordance with some examples.

FIG. 5B is a block diagram of a switch 520 which may be used to copy interesting traffic (e.g., as discussed above) to a processing device, such as a CPU, for processing. In some examples, switch 520 may be substantially similar to switch 504 discussed above. Switch 520 may be located within a data plane (e.g., data plane 502) and receive network traffic traversing the data plane from a source (e.g., a user client device, etc.) and to a destination (e.g., a server, other user client device, etc.).

Switch 520 includes a network flow records store 522. Here, network flow records store 522 is depicted as a table; however, it is understood that network flow records store 522 may be a dictionary, non-relational database, unstructured data store, or any other storage scheme. Network flow records store 522 includes records 530-531 associated with a source 525, a destination 526, and one or more bitflags 527. For example, source 525 and/or destination 526 may be associated with a user device 501 or a server 503 discussed above in reference to FIG. 5A. Bitflags 527 include a sequence of bits (e.g., Boolean (1 or 0) valued data structures) that denote whether an associated process (e.g., NBAR2 process 508, ETA process 509, ART process 510, etc.) requires packets from network traffic flow associated with a respective entry (e.g., user device 501 as source 525 and server 503 as destination 526, etc.). A particular bitflag, such as the first in the sequence for example, may be a copy-to-CPU bit and inform switch ASIC 520 whether to copy a respective packet to a CPU accessible traffic cache 523 for processing and analytics. In some examples, a logical OR operation can be applied to all other bits (e.g., besides the copy-to-CPU bit) within bitflags 528 or 529 to set the copy-to-CPU bit. In effect, where all other bits are valued at 0, the copy-to-CPU bit will be set to 0, where any or all other bits are set to 1 and so packets will be copied to traffic cache 523 when any bit indicates an associated process requires packets to process. Further, only the copy-to-CPU bit need be checked rather than every bit within bitflags 528-529 and so traffic need not be slowed down by additional computations.

Switch 520 includes a CPU 521 to perform processing on packets copied to traffic cache 523. In addition, CPU 521 may provide copied packets or process output (e.g., from processing copied packets) to services in control plane 506 via a control plane interface 524.

Figure 5C:
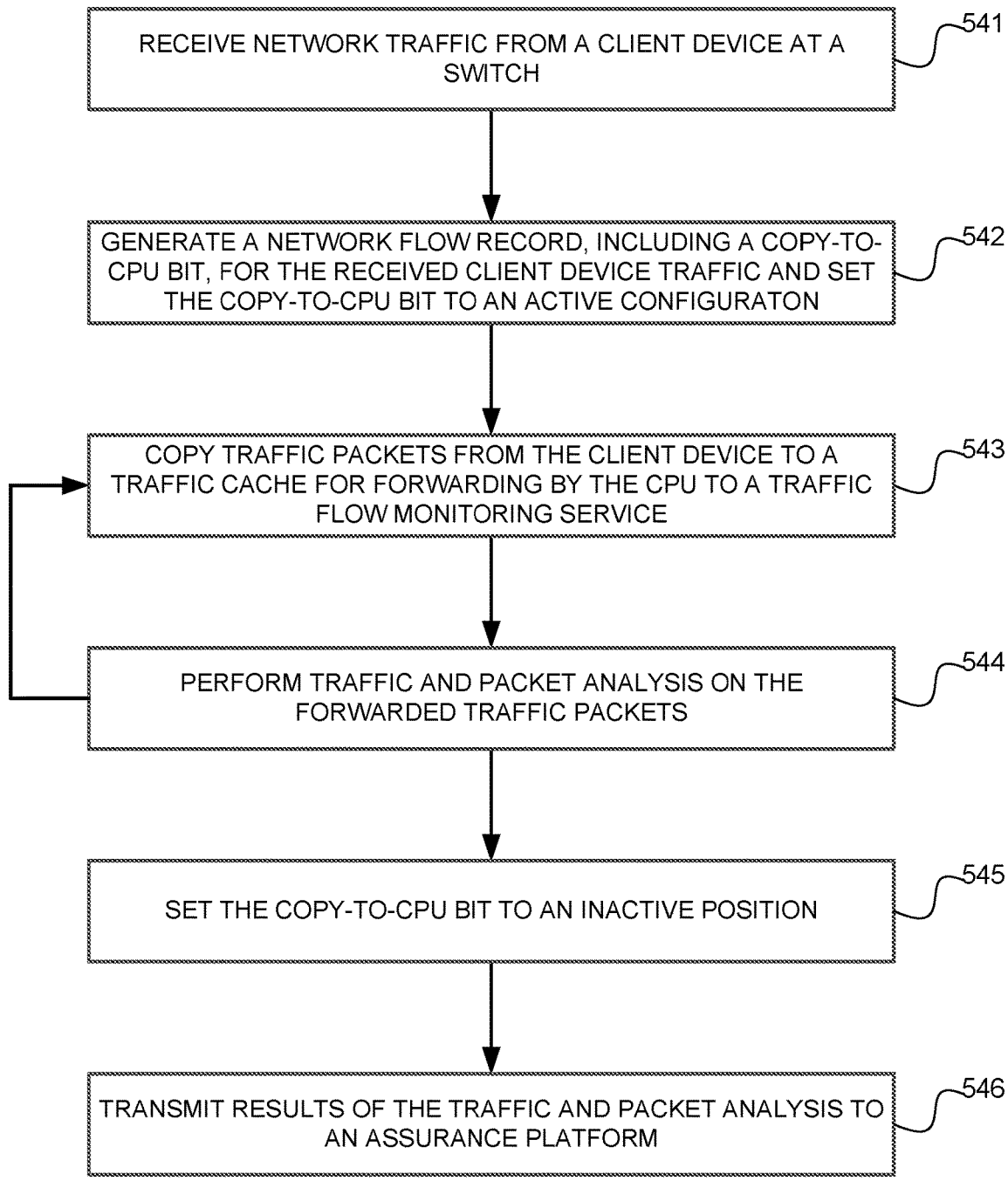
FIG. 5C illustrates a flowchart of an example method for switch triggered traffic tracking in accordance with some examples.

FIG. 5C depicts a method 540 for processing network traffic at a switch. For example, network traffic may be received by a switch and processed according to method 540 to generate telemetry, analytics, and other data for an assurance platform, network administrator, downstream services, etc.

At step 541, the switch receives network traffic from a client device. The client device may be any endpoint in a network such as a computer, mobile device (e.g., smartphone, tablet, etc.), server, network connected device, etc.

At step 542, a network flow record is generated. The network flow record may include a copy-to-CPU bit and indicate a traffic flow from the client device and to a receiving destination (e.g., a source and a destination) which is to be copied to a CPU accessible memory, such as a traffic cache. The copy-to-CPU bit may be set to a default state at record generation (e.g., into an off position, or to 0, until a troubleshooting event occurs, etc.).

At step 543, packets from network traffic flow indicated by the network traffic flow record are copied the traffic cache for forwarding to a traffic flow monitoring service. For example, the traffic flow monitoring service may be onboard the switch, a downstream process (e.g., within a network control plane), or a spread across both.

At step 544, traffic and packet analysis is performed on the forwarded packets. In some examples, analytics, telemetry data, and other data may be produced by the traffic and packet analysis. In some examples, the traffic and packet analysis may initiate additional downstream processes (e.g., automated repair and/or reporting services, etc.). In cases where one or more processes need multiple packets for performing traffic and packet analysis, steps 543-544 may loop through additional sequential packets until no more packets are needed by processes, etc.

At step 545, the copy-to-CPU bit is set to an inactive position (e.g., 0). In some examples, a logical OR operation may be performed on other bits within a series of bits from the network flow record indicating whether associated processes require additional packets. Where no more additional packets are required by processes, the associated bits may be set to 0 and the logical OR operation may return a 0 value (to which the copy-to-CPU bit may be set).

At step 546, results of the traffic and packet analysis may be transmitted to an assurance platform. The assurance platform may perform additional processing of the results such as visualizations, logging, reporting, etc.

Figure 5D:
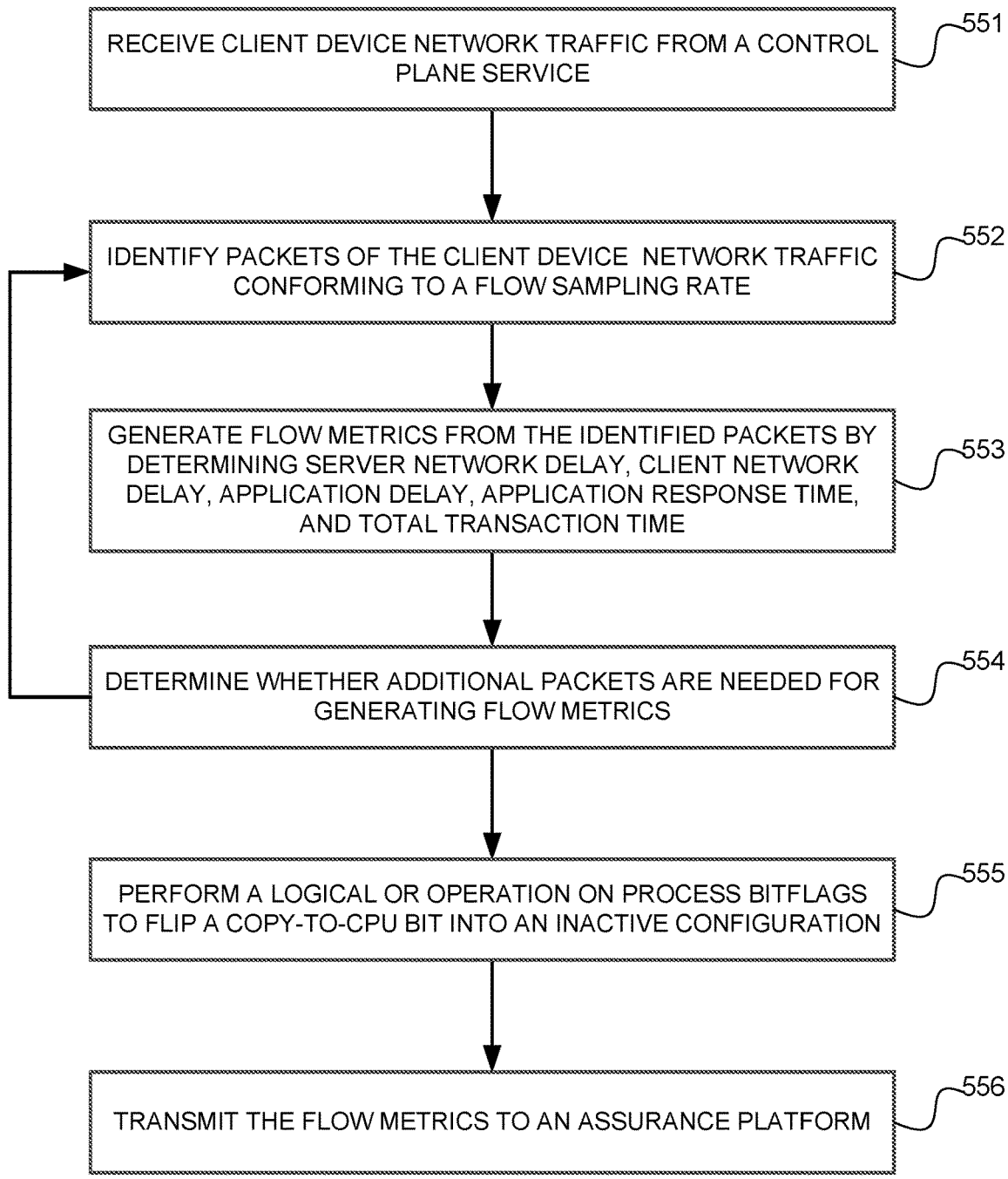
FIG. 5D illustrates a flowchart of an example method for generating flow metrics in accordance with some examples.

FIG. 5D depicts a method 550 that may be performed alongside or instead of steps 544-546 above and by, for example, ST3 process 510. In particular, method 550 may be performed over a series of processes in a network control plane (e.g., control plane 506, etc.) for monitoring and managing network traffic flows.

At step 551, client device network traffic is received from a control plane service. In some examples, the control plane service may be an upstream process or processes such as, for example, NBAR2 process 508 and/or ETA process 509 discussed above.

At step 552, packets are identified that conform to a flow sampling rate. For example, a traffic sampler 511 may include a sample rate denoting a certain proportion of packets to sample from a particular network traffic flow. Packets can be checked against a count to determine whether to process throughout method 550.

At step 553, flow metrics are generated from the identified packets by determined various network characteristics. The network characteristics may include, for example and without imputing limitation, server network delay (SND), client network delay (CND), application delay (AD), application response time (ART), and total transaction time (TT).

At step 554, whether additional packets are needed for generating flow metrics may be determined. For example, SND, CND, AD, ART, and TT may require multiple packets in sequence to determine flow metrics. In some examples, flow metrics may require additional packets until a threshold value within a packet is received (e.g., an acknowledgement, success update, etc.). Where additional packets are needed, method 550 may loop back to step 552.

At step 555, a logical OR operation on process bitflags can be performed to flip a copy-to-CPU bit into an inactive configuration (e.g., to 0). With the copy-to-CPU bit in an inactive configuration, an associated switch may cease copying respective packets of network traffic flow to a memory.

At step 556, the flow metrics are transmitted to an assurance platform. The assurance platform may perform additional processing of the results such as generating visualizations, logging, reporting, etc.

Figure 6A:
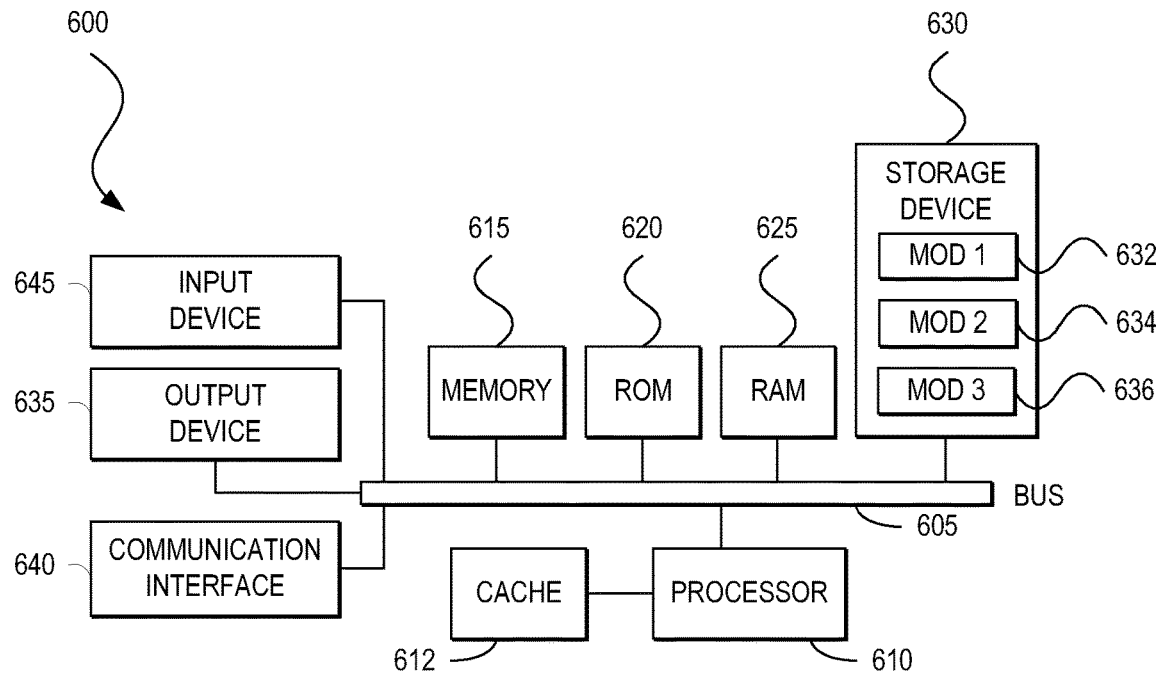
FIGS. 6A and 6B illustrate examples of systems in accordance with some examples.
Figure 6B:
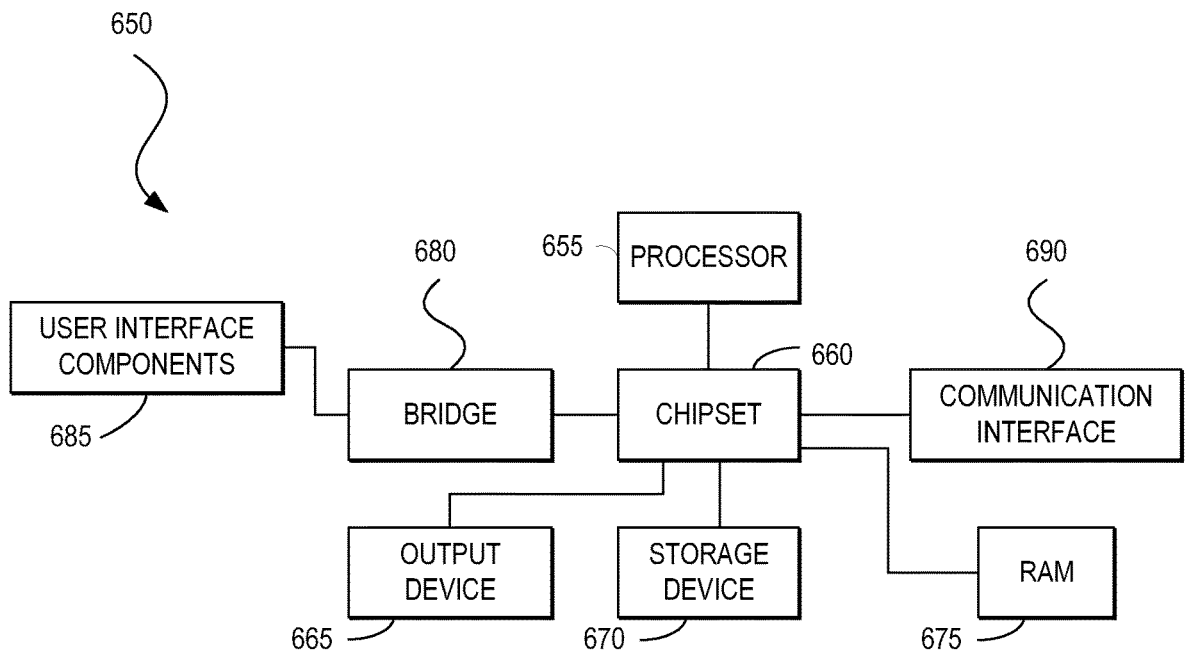

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Examples are provided herein to enhance understanding of the disclosure. A specific set of statements are provided as follows:

Statement 1: A computer-implemented method includes receiving network traffic including one or more packets, generating a network traffic flow record associated with the received network traffic, the network traffic flow record including a copy-to-CPU bit and one or more function flag bits, setting the copy-to-CPU bit to an on configuration, processing the one or more packets by one or more functions to generate network flow analytics, wherein the one or more function flag bits are set in response to the one or more functions generating network flow analytics, and setting the copy-to-CPU bit to an off configuration.

Statement 2: A method according to Statement 1 further includes copying the one or more packets to a hardware memory based on the copy-to-CPU bit.

Statement 3: A method according to any of the preceding Statements further includes providing the network flow analytics to one or more assurance platforms.

Statement 4: A method according to any of the preceding Statements, wherein the copy-to-CPU bit is set to an off configuration in response to respective configurations of the one or more function flag bits, further includes setting the one or more function flag bits to an off configuration in response to processing the copied one or more packets.

Statement 5: A method according to Statement 4 further includes performing a logical OR operation on the one or more function flag bits to set the copy-to-CPU bit to an off configuration.

Statement 6: A method according to any of the preceding Statements includes processing the one or more packets being performed in a control plane of a network.

Statement 7: A method according to any of the preceding Statements includes the network traffic being received by a switch and the switch generating the network traffic flow record and processes the one or more packets.

Statement 8: A system includes a switch having one or more processors, the switch configured to receive and transmit packets across a network, and a memory storing instructions for the one or more processors to receive network traffic including one or more packets, generate a network traffic flow record associated with the received network traffic, the network traffic flow record including a copy-to-CPU bit and one or more function flag bits, set the copy-to-CPU bit to an on configuration, process the one or more packets by one or more functions to generate network flow analytics, wherein the one or more function flag bits are set in response to the one or more functions generating network flow analytics, and set the copy-to-CPU bit to an off configuration.

Statement 14: A non-transitory computer readable medium includes instructions that, when executed by one or more processors, cause the one or more processors to receive network traffic including one or more packets, generate a network traffic flow record associated with the received network traffic, the network traffic flow record including a copy-to-CPU bit and one or more function flag bits, set the copy-to-CPU bit to an on configuration, processing the one or more packets by one or more functions to generate network flow analytics, wherein the one or more function flag bits are set in response to the one or more functions generating network flow analytics, and set the copy-to-CPU bit to an off configuration.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   receiving a network flow with a copy-to-CPU bit in an active configuration;
   identifying one or more packets in the network flow when the one or more packets conform to a flow sampling rate;

in response to a determination that additional packets are not required for generating flow metrics, setting the copy-to-CPU bit to an inactive configuration;
generating the flow metrics from the one or more packets; and
transmitting the flow metrics.

2. The method of claim 1, further comprising transmitting the flow metrics to one or more assurance platforms.

3. The method of claim 1, wherein the flow sampling rate denotes a proportion of packets in the network flow to be identified.

4. The method of claim 1, wherein the flow metrics are generated based on one or more network characteristics applied to the one or more packets.

5. The method of claim 1, further comprising:
determining whether additional packets from the network flow are needed to generate the flow metrics; and
in response to determining that additional packets are needed, identifying one or more additional packets from the network flow.

6. The method of claim 5, wherein the determining whether additional packets from the network are needed is based on a sequence or threshold value.

7. The method of claim 1, wherein the copy-to-CPU bit is set to the inactive configuration via a logical OR operation.

8. A system comprising:
at least one processor; and
at least one memory storing instructions which when executed causes the at least one processor to:
receive a network flow with a copy-to-CPU bit in an active configuration;
identify one or more packets in the network flow when the one or more packets conform to a flow sampling rate;
in response to a determination that additional packets are not required for generating flow metrics, set the copy-to-CPU bit to an inactive configuration;
generate the flow metrics from the one or more packets; and
transmit the flow metrics.

9. The system of claim 8, further comprising instructions, which when executed, causes the at least one processor to transmit the flow metrics to one or more assurance platforms.

10. The system of claim 8, wherein the flow sampling rate denotes a proportion of packets in the network flow to be identified.

11. The system of claim 8, wherein the flow metrics are generated based on one or more network characteristics applied to the one or more packets.

12. The system of claim 8, further comprising instructions, which when executed, causes the at least one processor to:
determine whether additional packets from the network flow are needed to generate the flow metrics; and
in response to determining that additional packets are needed, identify one or more additional packets from the network flow.

13. The system of claim 12, wherein the determination of whether additional packets from the network are needed is based on a sequence or threshold value.

14. The system of claim 8, wherein the copy-to-CPU bit is set to the inactive configuration via a logical OR operation.

15. At least one non-transitory computer readable medium storing instructions which when executed causes the at least one processor to:
receive a network flow with a copy-to-CPU bit in an active configuration;
identify one or more packets in the network flow when the one or more packets conform to a flow sampling rate;
in response to a determination that additional packets are not required for generating flow metrics, set the copy-to-CPU bit to an inactive configuration;
generate the flow metrics from the one or more packets; and
transmit the flow metrics.

16. The at least one non-transitory computer readable medium of claim 15, wherein the flow sampling rate denotes a proportion of packets in the network flow to be identified.

17. The at least one non-transitory computer readable medium of claim 15, wherein the flow metrics are generated based on one or more network characteristics applied to the one or more packets.

18. The at least one non-transitory computer readable medium of claim 15, further comprising instructions, which when executed, causes the at least one processor to:
determine whether additional packets from the network flow are needed to generate the flow metrics; and
in response to determining that additional packets are needed, identify one or more additional packets from the network flow.

19. The at least one non-transitory computer readable medium of claim 18, wherein the determination of whether additional packets from the network are needed is based on a sequence or threshold value.

20. The at least one non-transitory computer readable medium of claim 15, further comprising instructions, which when executed, causes the at least one processor to:
transmitting the flow metrics to one or more assurance platforms.

* * * * *